(12) United States Patent
Drotning

(10) Patent No.: US 6,439,458 B1
(45) Date of Patent: Aug. 27, 2002

(54) APPARATUS FOR CONTROLLING SYSTEM STATE BASED ON UNIQUE IDENTIFIERS

(75) Inventor: William D. Drotning, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 856 days.

(21) Appl. No.: 08/761,098

(22) Filed: Dec. 5, 1996

(51) Int. Cl.[7] .................................................. G06K 5/00
(52) U.S. Cl. ........................................ 235/382; 235/384
(58) Field of Search ................................ 235/380, 382, 235/384

Primary Examiner—Harold I. Pitts
(74) Attorney, Agent, or Firm—V. Gerald Grafe

(57) ABSTRACT

An apparatus allows workers to assert and release control over the energization of a system. The apparatus does not require the workers to carry any additional paraphernalia, and is not be easily defeated by other workers. Users asserting and releasing control present tokens uniquely identifying each user to a reader, and the apparatus prevents transition of the system to an undesired state until an appropriate number of users are currently asserting control. For example, a dangerous manufacturing robot can be prevented from energizing until all the users that have asserted control when entering the robot's controlled space have subsequently released control when leaving the robot's controlled space.

19 Claims, 3 Drawing Sheets

US 6,439,458 B1

APPARATUS FOR CONTROLLING SYSTEM STATE BASED ON UNIQUE IDENTIFIERS

This invention was made with Government support under Contract DE-AC04-94AL85000 awarded by the U.S. Department of Energy. The Government has certain rights in the invention.

BACKGROUND OF THE INVENTION

This invention relates to the field of machine safeguarding devices, and more specifically to the field of lockout devices for allowing multiple users to control energization of systems.

There are many tasks where a person or persons must enter the dangerous workspace of a robot or other system. Examples of such tasks include machine maintenance, product quality inspection, process monitoring, and management inspection. Often, the operation of the system can be hazardous to humans, either by physical contact with dangerous parts (e.g., cutting tools, lifts and presses) or by dangerous environmental conditions (e.g., extreme temperatures, airborne chemicals). For safety, therefore, the system must be prevented from operating while people are within the potentially hazardous space (the controlled space). This is often accomplished with barriers and doors that prevent system operation when opened. To restart the system, the barrier or door must be closed. Additional external resets are sometimes required.

Unfortunately, if the hazardous space is such that people inside the space are not always visible from the reset location, then people inside can be endangered if someone else resets the system. Administrative means such as safety checklists and visual inspections can help, but do not give those inside the space personal control over the reset of the machine.

In simple mechanical systems physical locks are often used to provide personal control over a system. Each worker applies and removes his own lock to the reset switch. The system can not be reset until all the locks have been removed. This straightforward approach has drawbacks, however. Physical locks can damage work in progress (e.g., scratch paint on car bodies) and can be bypassed by anyone with a bolt cutter. Management of unique locks and keys for many workers can be problematic. Also, workers without locks, workers whose locks have been forgotten, and workers whose locks are controlling other machines can not assert control over a machine.

Enabling plugs are also often used. Workers entering the controlled space remove a plug that enables the system to start. The plugs are usually not unique, however, and so systems can be energized while workers are still in danger.

Advanced electronic systems can limit access to an area to specific individuals. These systems must be very complex, however, to verify identity and limit access to pre-approved individuals. Generally a database must be created and managed. Special cards or keys are required to allow the system to identify authorized users. The expense of such systems makes them unrealistic for use with most machines.

There is a need, therefore, for an inexpensive apparatus that gives workers inside a controlled space personal control over the transition of a system from one state to. another (e.g., from halted to energized). The apparatus should not require the workers to carry any additional paraphernalia, and should not be easily defeated by other workers.

SUMMARY OF THE INVENTION

The present invention provides an apparatus that allows multiple workers to independently control the energization of a system. The apparatus does not require the workers to carry any additional paraphernalia, and is not easily defeated by other workers. Workers assert control over the system by entering an identifier unique to the worker into the apparatus. Workers release control by entering the same identifier into the apparatus. The apparatus remembers the identifiers associated with assertion of control, and can prevent energization of the system until all the workers that asserted control have subsequently released control. The apparatus can also prevent transition of the system to an undesired state until a desired number of users remain with control asserted. For example, a manufacturing robot can be prevented from energizing until all the users that have asserted control on entering the controlled space have subsequently released control on leaving the controlled space. As another example, a lift can be prevented from operating until an appropriate number of users are on it.

Advantages and novel features will become apparent to those skilled in the art upon examination of the following description or may be learned by practice of the invention. The objects and advantages of the invention may be realized and attained by means of the instrumentalities and combinations particularly pointed out in the appended claims.

DESCRIPTION OF THE FIGURES

The accompanying drawings, which are incorporated into and form part of the specification, illustrate embodiments of the invention and, together with the description, serve to explain the principles of the invention.

FIG. 3a is flow diagram of control of one embodiment of the present invention.

FIG. 3b is a diagram of identifier storage used by the control of FIG. 3a.

DETAILED DESCRIPTION OF THE INVENTION

The present invention provides an apparatus for preventing the transition of a system from one state to another based on the assertion and release of control by multiple users.

Figure 1:
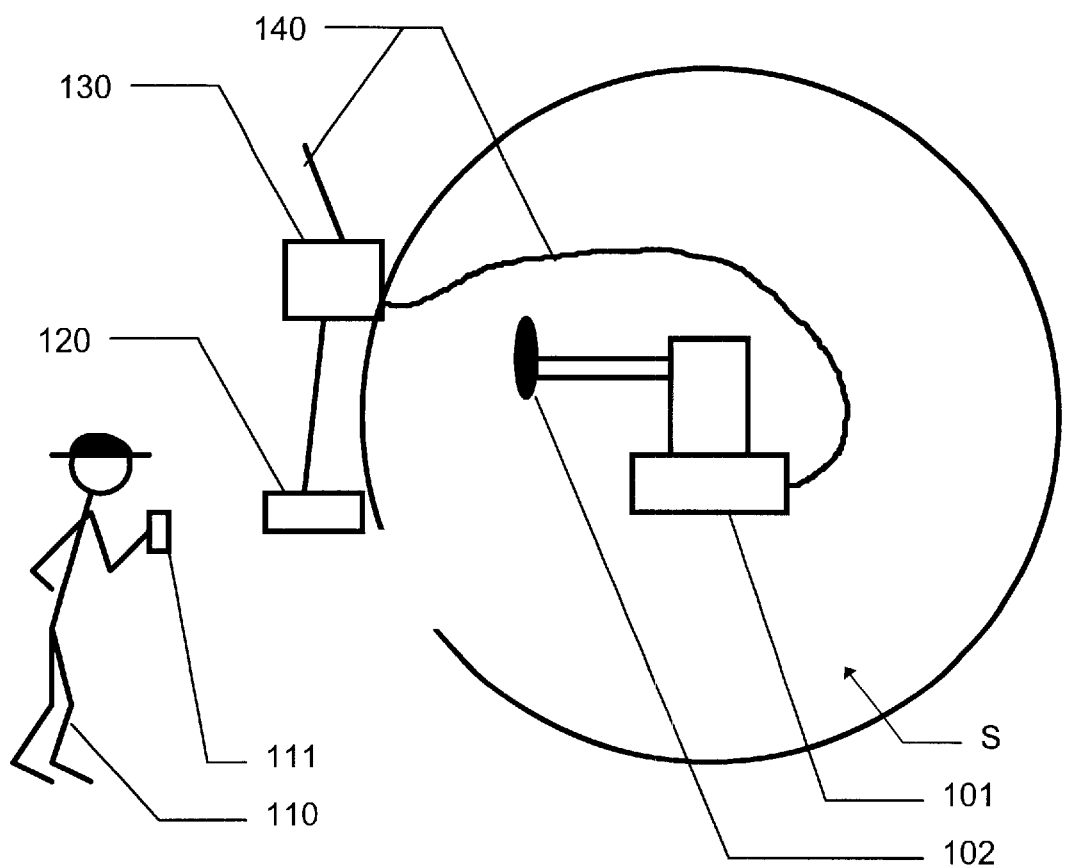
FIG. 1 is an illustration of a lockout apparatus according to the present invention.

FIG. 1 is an illustration of a lockout apparatus according to the present invention. In the figure, a robot 101 and end effector 102 can be dangerous to workers within a controlled space S. A worker 110 has a token 111 that is uniquely associated with the worker 110. Examples of suitable tokens include barcodes and magnetic strips on employee identification badges, credit cards, and biometric information. When the worker 110 enters or exits the controlled space S, the worker 110 presents the token 111 to the reader 120. The reader 120 reads the token 111. A controller 130 monitors the tokens read entering and exiting, and does not allow power 140 to the robot 101 if there are any tokens that were read entering the controlled space S that have not been subsequently been read exiting the controlled space S. Each token read exiting the controlled space S can only release control for that token; one worker's control can not be released by another worker's token. Each worker can thereby retain personal control over the energization of the robot through personal control of the token.

Figure 2:
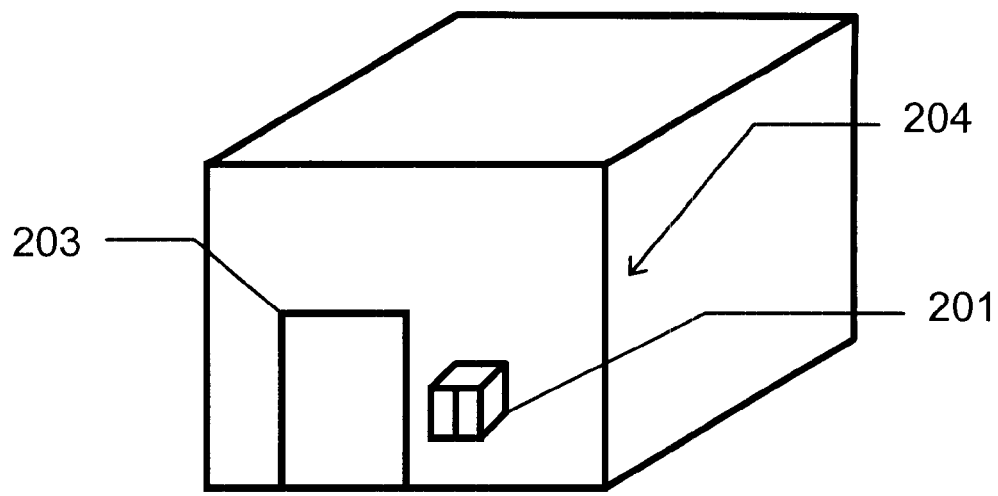
FIG. 2 is an illustration of a lockout apparatus according to the present invention.

FIG. 2 shows a lockout system according to the present invention. A reader 201 is mounted near the entry 203 of a controlled space 204. The controlled space can be a dangerous machine (not shown) such as a robot or a dangerous environment such as an oven. Those skilled in the art will appreciate many such controlled spaces common in modem industrial processes. The reader 201 must be able to read tokens presented by users asserting and releasing control over the controlled space 204. The tokens can be uniquely associated with a user, or can be re-used by many users, for example by having a container of tokens near the reader itself. The reader 201 must be able to distinguish each token from every other token, however. The tokens can be magnetic strips on employee identification badges, credit cards, or other similar devices. Suitable magnetic strip readers such as those used in commercial transactions include credit card scanners and automated teller machines. The tokens can also be read optically, as for example with barcodes placed on employee identification badges or on tools uniquely assigned to each employee. Suitable optical scanners such as are used in commercial transactions include grocery code barcode readers and library barcode checkout systems. The reader 201 could also read other information unique to each employee such as biometric information or passwords. Those skilled in the art will appreciate other employee-specific information that could be appropriate tokens.

The reader 201 can also monitor non-human users. As an example, a unique token could be entered for each parts cart entering and exiting an oven. The reader 201 could track the number of parts carts in the oven and not allow the oven to heat until all the carts were removed. The reader 201 can distinguish between entering and exiting users by, for example, direction sensors, a switch or button near the reader 201, separate entry and exit readers, and distinct scanning procedures for entry and exit. The reader 201 can also allow for a supervisory reset by allowing a special token, password, key, or other operation to reset the system so that lost tokens do not permanently lockout the system.

Figures 3A, 3B:
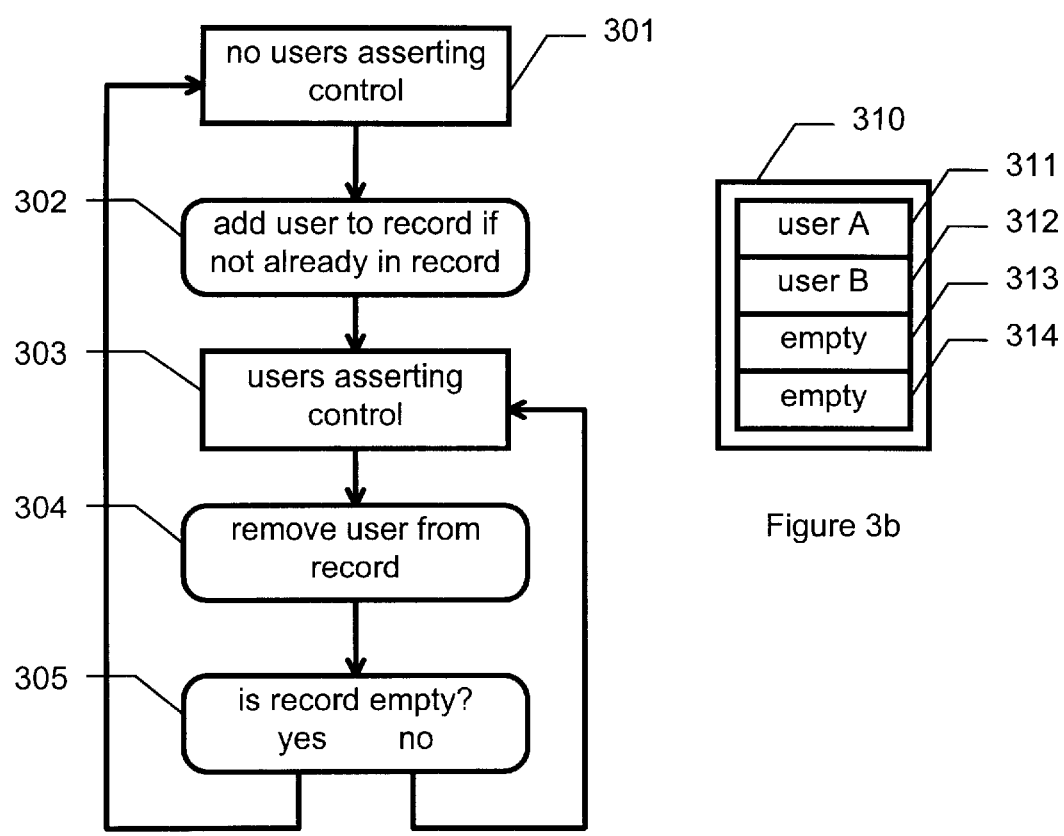

FIG. 3a shows a flow diagram of control for a reader suitable for use with the present invention. State 301 signifies that no users have asserted control over the system. Tokens indicating users releasing control cause the controller to remain in state 301. If a token indicates a user asserting control, then the entering user identification is added to the record of users asserting control 302. The controller is then in state 303, signifying that at least one user has asserted control and not subsequently released control. Tokens indicating additional users asserting control will cause those user identifications to be added to the record if not already present. Tokens indicating users releasing control will cause the user identification of the releasing user to be removed from the record 304. If the record is empty 305 then the controller will return to state 301, signifying that no users remain in control of the system. If the record is not empty 305, then users are still in control of the system and so the controller returns to state 303. FIG. 3b shows an example record 310 indicating that two users, user A 311 and user B 312, have asserted control. Two other locations 313, 314 in the record 310 are empty, indicating that they do not contain user identification for users having asserted control. Those skilled in the art will appreciate other ways of maintaining the record, including lists and tables, for example.

The token reading apparatus can also provide feedback to ease human operability. An auditory, visual, or other feedback signal can be provided to indicate a successfully read token. The feedback can be different for token reads asserting control and token reads releasing control. The number of users asserting control can be communicated by a numeric display or other means, so that users can determine how many users have asserted but not yet released control. Some applications might also allow system state transition or energization when a specified number or pattern of users have asserted, then released, control. For example, a robot might be energized when all but one user has released control, where the remaining user is a "teacher" for the robot's programmed operation.

For some machine safeguarding applications the lockout apparatus would have to be "control reliable" as defined in ANSI B11.19. Typically, redundancy and cross-checking are used to ensure that no single component failure can prevent the safe operation of the system. This could be achieved in the present invention in various ways. For example, two independent token readers and control processors could be used. The system transition from one state to another (e.g., energized to not energized) could be prevented unless both readers and control processors agreed that the transition was allowable.

The particular sizes and equipment discussed above are cited merely to illustrate particular embodiments of the invention. It is contemplated that the use of the invention may involve components having different sizes and characteristics. It is intended that the scope of the invention be defined by the claims appended hereto.

I claim:

1. An apparatus for allowing a plurality of users to assert and release control of the transition of a system from a first state to a second state, comprising:
   a) token means for reading tokens, where each token is uniquely controlled by one user while such user is asserting control of the system, and
   b) lockout means for preventing the transition of the system from the first state to the second state until a selected pattern of tokens has been read by the token means.

2. The apparatus of claim 1, wherein the token means comprises:
   a) reader means for reading tokens; and
   b) discrimination means for discriminating between tokens of users asserting control of the system and tokens of users releasing control of the system.

3. The apparatus of claim 2, wherein each token is associated with unique token identification information, and wherein the token means additionally comprises:
   a) storage means for storing token identification information;
   b) addition means for adding token identification information to the storage means when the token of a user asserting control of the system is read; and
   c) removal means for removing token identification from the storage means when the token of a user releasing control of the system is read.

4. The apparatus of claim 3, wherein the lockout means comprises:
   a) means for determining a first number equal to the number of tokens whose token identification information has been added to but not subsequently removed from the storage means; and
   b) means for preventing the transition of the system from the first state to the second state until the first number reaches a selected value.

5. The apparatus of claim 2 wherein the lockout means comprises means for preventing the transition from the first state to the second state if there is a user that has not released control after such user last asserted control.

6. The apparatus of claim 2 wherein the reader means comprises means for reading tokens comprising information chosen from the group consisting of: optical, electromagnetic, biometric, and combinations thereof.

7. The apparatus of claim 2 wherein the discrimination means is chosen from the group consisting of:
   a) a switch responsive to the user indicating assertion or release of control of the system;
   b) a sensor responsive to user motion;
   c) a first reader means for reading tokens of users asserting control of the system and a second reader means for reading tokens associated with users releasing control of the system; and
   d) reader means responsive to the orientation of a token being read, where a first token orientation indicates assertion of control of the system and a second token orientation indicates release of control of the system.

8. The apparatus of claim 1 further comprising override means for allowing the transition from the first state to the second state even if the selected pattern of tokens has not been read by the token means.

9. The apparatus of claim 2 wherein the lockout means comprises means to prevent electrical and mechanical energy flow into the system.

10. An apparatus to prevent the transition of a system from a first state to a second state based on the presence of users, where each user has a uniquely associated token with information uniquely identifying the user, and where the system comprises a controlled space, said apparatus comprising:
   a) reader means for reading identifying information from tokens;
   b) discrimination means for discriminating between tokens of users entering the controlled space and tokens of users exiting the controlled space;
   c) determination means for determining a first number of tokens read entering the controlled space and not subsequently read exiting the controlled space; and
   d) lockout means for preventing the transition from the first state to the second state if the first number reaches a predetermined value.

11. The apparatus of claim 10, further comprising reset means for allowing the transition of the system from the first state to the second state independent of the entry and exit of users.

12. The apparatus of claim 11, wherein the reset means comprises a selected reset token.

13. The apparatus of claim 10, further comprising feedback means for signaling that a token has been read.

14. The apparatus of claim 13, wherein the feedback means is chosen from the group consisting of: an audible sound, a visual display, a light.

15. The apparatus of claim 13, wherein the feedback means comprises:
   a) a first signal indicating a token of a user entering the controlled space has been read; and
   b) a second signal indicating that a token of a user exiting the controlled space has been read, wherein the second signal is detectably different from the first signal.

16. The apparatus of claim 10, further comprising communication means for communicating the first number.

17. An apparatus for preventing the energization of equipment based on the actions of a plurality of users, comprising:
   a) input means for allowing a user to enter identifying information and to indicate whether such user is asserting or releasing control of the energization of the equipment;
   b) determination means for determining a first number equal to the number of users that have asserted control of the energization of the equipment that have not subsequently released control of the energization of the equipment; and
   c) lockout means for preventing the energization of the equipment unless the first number reaches a predetermined value.

18. The apparatus of claim 17, wherein the identifying information comprises a token controlled by the user while the user is asserting control of the energization of the equipment.

19. The apparatus of claim 17, wherein the first number is chosen from the group consisting of: zero, one, two, three, four, and five.

* * * * *